United States Patent
Söntgerath et al.

(10) Patent No.: US 6,294,272 B2
(45) Date of Patent: *Sep. 25, 2001

(54) ALUMINIUM ALLOY FOR USE AS CORE MATERIAL IN BRAZING SHEET

(75) Inventors: Jeroen Andreas Helmuth Söntgerath, Amsterdam (NL); Achim Bürger, Höhr-Grenzhausen; Klaus Vieregge, Neuwied, both of (DE)

(73) Assignee: Corus Aluminium Walzprodukte GmbH, Koblenz (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/202,931
(22) PCT Filed: Nov. 4, 1997
(86) PCT No.: PCT/EP97/06070
    § 371 Date: Mar. 24, 1999
    § 102(e) Date: Mar. 24, 1999
(87) PCT Pub. No.: WO98/20178
    PCT Pub. Date: May 14, 1998

(30) Foreign Application Priority Data

Nov. 4, 1996 (NL) ..................................................... 1004415

(51) Int. Cl.[7] ............................. B32B 15/20; F28F 21/08; C22C 21/00
(52) U.S. Cl. .......................... 428/654; 420/535; 420/551; 420/552
(58) Field of Search ..................................... 428/654, 650; 420/533, 535, 538, 537, 551, 552

(56) References Cited

U.S. PATENT DOCUMENTS

| 4,244,756 | * | 1/1981 | Tanabe et al. | 148/32 |
| 4,317,484 | * | 3/1982 | Tanabe et al. | 165/134 R |
| 4,673,551 | * | 6/1987 | Sugiyama et al. | 420/535 |
| 4,761,267 |   | 8/1988 | Takeno et al. | 420/529 |
| 5,744,255 | * | 4/1998 | Doko et al. | 428/654 |
| 5,863,669 | * | 1/1999 | Miller | 428/654 |
| 6,019,939 | * | 2/2000 | Gray et al. | 420/528 |

FOREIGN PATENT DOCUMENTS

| 3518407 |   | 11/1985 | (DE) . |
| 492796  |   | 7/1992  | (EP) . |
| 0718072 | * | 6/1996  | (EP) . |
| 59-89999 | * | 5/1984 | (JP) . |
| 63-186847 |  | 8/1988 | (JP) . |
| 64-83396 | * | 3/1989 | (JP) . |
| 2-30394 |   | 1/1990  | (JP) . |
| 4-263033 | * | 9/1992 | (JP) . |

(List continued on next page.)

OTHER PUBLICATIONS

Chemical Abstracts, vol. 110, No. 6, Abstract No. 43255 "Aluminum Alloy for Heat–Exchanger Cores", Feb. 1989 (Abstract of JP 63186847).

Primary Examiner—John J. Zimmerman
(74) Attorney, Agent, or Firm—Stevens, Davis, Miller & Mosher, LLP

(57) ABSTRACT

An aluminium alloy for use as a core material in brazing sheet, comprising, in weight %: Mn 0.7–1.5, Cu 0.6–1.0, Fe not more than 0.4, Si less than 0.1, Mg 0.05–0.8, Ti 0.02–0.3, Cr 0.1–0.25, Zr 0.1–0.2, balance Al and unavoidable impurities, wherein $0.20<(Cr+Zr)\leq0.4$, the alloy being capable of obtaining in the post-brazing state 0.2% yield strength of at least 65 MPa and having a corrosion life of more than 11 days in a SWAAT test without perforations in accordance with ASTM G-85.

10 Claims, 1 Drawing Sheet

FOREIGN PATENT DOCUMENTS 4-263036 * 9/1992 (JP).
4-297541    10/1992 (JP).
4-276039 * 10/1992 (JP).
 5-43971 * 2/1993 (JP).
5-339666 * 12/1993 (JP).
6-212331 *  8/1994 (JP).
 9422633    10/1994 (WO).

* cited by examiner

ALUMINIUM ALLOY FOR USE AS CORE MATERIAL IN BRAZING SHEET

FIELD OF THE INVENTION

This invention relates to an aluminium alloy for use as a core material in brazing sheet, to a brazing sheet comprising the aluminium alloy as core material, to the use of the aluminium alloy as core material of a brazing sheet in a brazed assembly and to a brazed assembly containing at least one member having the aluminium alloy as core material. The aluminium alloy is of the AA3xxx type. The invention has the particular advantage that the alloy is non-heat-treatable, i.e. it does not require post-brazing ageing treatment. A principle use of brazing sheet containing such alloy is in heat exchangers, such as vehicle radiators, in which water is one heat-exchanging medium. Herein the term sheet material includes tube material.

DESCRIPTION OF THE PRIOR ART

Many proposals for an aluminium alloy to be used as a core material in brazing sheet have been made. Generally, in the prior art, the alloy is used as a core layer in a brazing sheet with a clad layer on at least one face. The clad layer provides corrosion protection.

WO 94/22633 describes such an alloy, having the composition in wt. %:

| | |
|---|---|
| Mn | 0.7–1.5 |
| Cu | 0.5–1.0, preferabiy >0.6–0.9 |
| Fe | 0.4 max. |
| Si | 0.15 max. |
| Mg | ≦0.8 |
| V and/or Cr | ≦0.3, preferably ≦0.2 |
| Ti | ≦0.1 |
| balance Al and impurities. | |

This is used as core material with corrosion-resistant clad layers containing Si. The high Cu content is to improve post-brazing sag resistance. Ti is preferably not deliberately added, though is typically present from source material. Preferably Zr is not deliberately added. Cr and/or V are said not to improve post-brazing corrosion resistance, but contribute to post-brazing strength and sag resistance.

U.S. Pat. No. 4,761,267 describes a core alloy for brazing, which has improved secular corrosion resistance due to a sacrificial anode or a filler metal on the water-contacting side. Thus the core alloy is used with clads on both sides. The composition is in wt. %:

| | |
|---|---|
| Mn | 0.6–1.0 |
| Cu | 0.5–1.0 |
| Fe | 0.3 max. |
| Si | 0.1 max. |
| Mg | optionally 0.05–0.4 |
| Ti | 0.1–0.3 |
| Cr | optionally 0.05–0.4 |
| Zr | optionally 0.05–0.4 |
| balance Al and impurities. | |

Cu is present to allow the filler metal and sacrificial anode to demonstrate the sacrificial anode effect. It also increases strength. Cu is said to decrease the corrosion resistance of the core alloy itself. Mg, Cr and Zr are optional elements for increasing strength. In none of the examples are Mg and Cr both present, and in only one are Cr and Zr present.

Another approach to obtaining corrosion resistance in core alloys is shown in EP-A-492796, where the core alloy contains in wt. % either Mn 0.5–1.5 at least one of: Ti (0.05–0.3) and

Zr (0.05–0.4)

or

Mg 0.05–1.0

Si 0.05–0.3, preferably 0.1–0.2 at least one of: Ti (0.05–0.3) and

Zr (0.05–0.4).

Also optional in either case are Fe (0.03–1.0) and Cu (0.05 to 0.2). In particular, Si is said to increase strength and is therefore preferably at 0.1–0.2. Cu at above 0.2 is said to be disadvantageous. Cr is not used. This core alloy is provided with clad layers.

JP-A-4-297541 discloses a core alloy for brazing tube, of composition:

| | |
|---|---|
| Mn | 0.3–1.5 |
| Cu | 0.2–0.9 |
| Mg | 0.2–0.5 |
| Si | 0.1–0.3 |
| Fe | 0.1–0.7 |
| Ti | 0.1–0.3 |
| optionally either or both of: | |
| Zr | (0.05–0.2) |
| Gr | (0.05–0.2) |
| balance Al and impurities. | |

This core alloy is assembled into tube with clad layers. Cu is for strength and to give corrosion resistance with the clad layers. Si is used for strength improvement, but at less than 0.1% has insufficient effect. Zr and Cr are for strength improvement, and in the examples where they are employed Cu is 0.5%.

JP-A-63-186847 discloses a core alloy for brazing material used with a sacrificial anode clad layer on one face. The composition is, in wt. %:

| | |
|---|---|
| Mn | 1.0–1.5 |
| Cu | 0.3–0.6 |
| Mg | 0.1–0.5 |
| Cr | 0.05–0.35 |
| Zr | 0.05–0.35 |
| optionally, one or both of | |
| V | (0.05–0.35) |
| Ti | (0.05–0.35) |
| Fe | 0.5 max. |
| Si | 0.5 max. |

Cr and Zr increase strength, and in the examples given total at least 0.3 wt. %. Si is an impurity, present at 0.15 wt. % in examples, and reducing corrosion resistance above 0.5 wt. %.

Corrosion resistance is of high importance especially in brazing sheet for use in automobile radiators. Long-life alloys are those which in the SWAAT test without perforations according to ASTM G-85 exceed 10–12 days (see K. Scholin et al., VTMS 1993, SAE P-263).

SUMMARY OF THE INVENTION

The object of the present invention is to provide a core alloy for brazing sheet which has improved properties over the alloys of the prior art, and in particular provides a combination of high post-brazing strength and high corrosion resistance. It is a particular feature that the core alloy of the invention does not require post-brazing ageing treatment, and that the core alloy has high corrosion resistance in the absence of the sacrificial anode coating layer which is generally employed in the prior art.

According to the invention, there is provided an aluminium alloy for use as a core material in brazing sheet, consisting of, in weight %:

| | |
|---|---|
| Mn | 0.7–1.5 |
| Cu | 0.6–1.0 |
| Fe | not more than 0.4 |
| Si | less than 0.1 |
| Mg | 0.05–0.8 |
| Ti | 0.02–0.3 |
| Cr | 0.1–0.25 |
| Zr | 0.1–0.2 |
| balance Al and unavoidable impurities | | wherein $0.20 \leq (Cr+Zr) \leq 0.4$, the alloy being capable of obtaining in the post-brazing state 0.2% yield strength of at least 65 MPa and having a corrosion life of more than 11 days in a SWAAT test without perforations in accordance with ASTM G-85.

This aluminium alloy has good mechanical properties and a good corrosion resistance of over 11 days in the SWAAT test without perforations according to ASTM G-85. In the best examples, this corrosion resistance is more than 16 days. This level of corrosion resistance qualifies the alloy as a long-life product. The alloy is a non-heat-treatable alloy. It is believed that the excellent properties are the result of the specific combination of the contents of particularly Cu, Si, Ti, Cr and Zr, which are all within relatively narrow ranges. Notably, the alloy has a high corrosion resistance in a brazing sheet without the presence of a clad layer acting as a sacrificial anode on the side contacting aqueous cooling fluid in use.

The aluminium alloy is of the AA3xxx type, Mn being the main alloying element in order to obtain the desired corrosion resistance. At least 0.7% is required for obtaining the desired corrosion resistance, while an Mn content of over 1.5% does not produce any significant improvements in respect of the strength because coarse Al—Mn-containing compounds are formed. A further disadvantage of coarse Al—Mn-containing compounds is that they reduce the rollability of the aluminium alloy. More preferably the Mn content is in a range of 0.8–1.2%.

Fe is present in all known aluminium alloys but in the aluminium alloys in accordance with the invention it is not a required alloying element and is not deliberately added. With a high Fe content among other things the corrosion resistance decreases. The admissible Fe content is 0.4% maximum and preferably 0.2% maximum.

The admissible Si content is 0.1% maximum. This low Si content is critical for the excellent long-life corrosion performance of the core alloy, because the low Si content promotes the formation of a sacrificial precipitation layer at the original filler-core interface during the brazing cycle. The filler in this case is a Si-containing low melting brazing alloy of conventional type. If the precipitate band known as 'brown band' is not present then in SWAAT testing the corrosion proceeds in an accelerated intergranular manner. When a precipitate band is present, the sacrificial nature of the band deflects the corrosion in a lateral manner, i.e. along the direction of the band parallel to the original filler-core interface, preventing through thickness penetration.

In the alloy with Si <0.1%, during brazing Si diffuses from the filler into the core. It appears that increasing the Si content reduces the solid solubility of Mn in aluminium, and hence the precipitation of Mn containing precipitates, i.e. α-MnSiAl, is enhanced. This favoured precipitation results in a dense band of precipitates, typically 40 to 70 μm thick in this region. For an effective precipitate band to form there has to be sufficient Mn available for combination with the Si. it appears therefore critical to keep Si (and preferably Fe) levels very low to prevent the formation of stable compounds during hot rolling and annealing which decrease the effective Mn level for the formation of the localized band. With a silicon content of over 0.1% in the alloy the Si reacts with Mn to form the α-AlMnSi phase in increasing quantities prior to brazing to the detriment of corrosion performance. As the Si content is increased the width of the precipitate band decreases, decreasing corrosion performance. At levels above 0.10% long-life performance is usually not achieved. It is the combination of these diffusion gradients, the higher concentration of Mn and Cu in solid solution making the core more noble to corrosion, and the presence of localized galvanic cells in the sacrificial band, that are responsible for the sacrificial protection. In the core alloy in accordance with this invention exhibiting excellent SWAAT resistance the sacrificial layer had a corrosion potential typically 30 mV lower than the under-laying core as measured according to ASTM G69.

Mg is added to the aluminium alloy since it is to serve as core alloy and be processed by vacuum brazing. If a flux brazing process is applied, then the Mg content is preferably lower than 0.4%. The Mg content is 0.8% maximum and preferably 0.5% maximum.

Cu increases the strength of the aluminium alloy. With a Cu content of over 1.0% undesired coarse Cu-containing compounds can be formed. It has been found that with a Cu content in a range of 0.6–1.0% the strength is optimum, while the desired long-life corrosion resistance does not decrease. Preferably the Cu content is more than 0.6%, particularly at least 0.7%.

The added Cr improves among other things the strength of the aluminium alloy in the post-brazed condition, particularly in combination with the high Cu content. With a Cr content of more than 0.25% there is decreasing advantage in respect of the increase in strength. Therefore the Cr maximum is taken at 0.25%. Preferably, the amount of Cr is 0.14–0.25%. The Cr content may optionally be substituted partially or wholly by V in the same amount, since V has an equivalent effect. Casting trials have indicated that with increasing Cr concentration there is an increased risk of the formation of coarse Cr containing intermetallic compounds. These compounds have been analysed to be predominantly Cr—Mn rich in composition and the risk of the formation of these particles increases with higher Mn levels as well as Cr level. These coarse intermetallics are detrimental to mechanical properties as they decrease the effective Mn and Cr for strength purposes, and are also detrimental for formability and corrosion.

Zr has a significant influence on strength, with increasing Zr improving the post-brazed properties. An important factor is that the effect of the Zr and the Cr on mechanical properties are additive as clearly shown in FIG. 1 described below, so increased strength benefits can be gained with a combined Zr and Cr addition compared to a Cr addition alone.

The significant benefit of Zr additions is therefore that higher mechanical properties can be gained with combined Zr+Cr (and Ti) without the risk of formation of detrimental coarse intermetallics than with Cr alone. Casting conditions (temperature, solidification rates, etc) can be tailored to maximize the allowable total additions of Zr, Cr (and Ti) to maximize strength. The strength and performance of the material can therefore be optimized in this manner.

Zr additions also have additional benefits in that Zr increases the recrystallization temperature of the material, increases the sag resistance, and also promotes the formation of elongated 'pancake' grains after brazing. These elongated pancake grains contribute to the good corrosion performance of the material by increasing the lateral tendency of the corrosion attack in a similar manner to the role of the sacrificial layer described above. Zr is restricted to a maximum addition level of 0.2%, since above this level problems can be encountered in casting due to incomplete dissolution.

It has also been found that Ti additions are also effective in increasing strength, particularly in conjunction with Zr. The Ti level is therefore specified in the range 0.02 to 0.3%, preferably 0.05 to 0.3%, more preferably 0.08 to 0.2%.

The optimized combined additions of Cr, Zr and Ti in terms of mechanical properties have been found not to significantly affect corrosion.

The Ti content, which possibly cooperates with small amounts of B present, is higher than is strictly necessary for obtaining grain refining of the casting structure. Ti is deliberately added, in the invention, to the desired level.

In the invention it is of importance to maintain the desired ratio of Cr and Zr. As well as the narrow ranges of Cr and Zr, the total of Cr and Zr is limited to 0.2–0.4%, preferably 0.25–0.35%.

By unavoidable impurities is meant as is normal that any additional element is less than 0.05% and the total of such elements is less than 0.15%.

In order to further improve the corrosion resistance of a brazing sheet product comprising the aluminium alloy in accordance with the invention as core alloy, it is possible to add Zn to the alloy in a range of up to 1.5% maximum.

Preferably in the aluminium alloy in accordance with the invention the total of Zr and Ti is not more than 0.3%.

In the aluminium alloy in accordance with the invention, in which the Cu content is in a range of 0.6–1.0%, copper is found to be present in the solid solution and in the τ-phase, $Al_{20}Mn_3Cu_2$, both before and after brazing. The size of these τ-phase particles is in the range 50–250 nm. Although τ-phase is present after brazing, sufficient Cu is retained in solid solution for the desired increase in post-brazed properties.

The strength in the post-brazing state can be measured by conducting a simulated brazing cycle, as is conventional in the art. Since the core alone provides the tensile strength of the brazing sheet, this cycle may be carried out on the core alloy alone or on a sheet having core and clad layers. The simulated brazing cycle used here is heating in a furnace and holding at 605–610° C. for 5 minutes, followed by air cooling.

The invention also consists in brazing sheet comprising, as core material (i.e. strength providing material), the alloy of the invention described above. While as mentioned a clad or coating layer acting as a sacrificial anode in contact with water is not required, such a layer may be provided on one or both sides of the core alloy. On one side, in contact with the core alloy, there will normally be a clad layer in the form of a conventional low melting alloy filler layer.

The invention further consists in use of the aluminium alloy of the invention described above as core material of a brazing sheet in a brazed assembly. In such an assembly, the aluminium alloy core material may be directly in contact with the brazing alloy which is melted at the brazing temperature. Because the aluminium alloy of the invention is non-heat-treatable, i.e. does not depend for its tensile strength on a post-brazing ageing treatment, such a treatment need not be performed in use of the present alloy in a brazed assembly.

The invention also provides a brazed assembly comprising at least two members bonded together by means of a brazing alloy, at least one of the members being of sheet material comprising the aluminium alloy of the invention described above as its core.

Brazing sheet with good long-life properties and with the aluminium alloy in accordance with the invention as core alloy, may be made by a method which comprises the steps:
(a) casting an ingot of the core alloy;
(b) providing the core alloy with a clad layer on at least one side;
(c) hot-rolling;
(d) cold-rolling to the desired finished thickness.

In this context casting an ingot of the core alloy is taken to mean that molten aluminium is solidified with the aid of casting techniques which are existing or being developed, such as DC-(semi)-continuous casting, EMC casting, continuous casting, EMS casting, block casting, etc.

After casting, the ingot of the core alloy obtained is milled and provided on at least one side with a clad layer of the desired composition. The combination obtained of milled ingot and a clad layer is then heated to within a range of 375–550° C. and preferably held in that temperature range as briefly as possible in order to keep the core alloy as much as possible in solid solution, or so that small Mn-containing precipitates form which are small enough to disappear again at a temperature of about 600° C. in a brazing cycle carried out subsequently. Then the combination is hot-rolled so as to obtain a good bond between the core alloy and the clad layer and the sheet thickness of the combination is reduced to within a range of 1–10 mm in order subsequently to b e cold-rolled to any desired finished thickness.

It is preferred in this method the cast ingot is homogenized prior to stage by at least a heat treatment of ½–24 hours at a temperature higher than 550° C., and preferably lower than 625° C. This achieves the effect of improving the formability of the aluminium alloy during rolling. With good process management of the homogenization cycle this does not necessarily mean that the corrosion resistance of the finished product decreases.

Preferably during stage (d) the brazing sheet undergoes an intermediate heat treatment (inter-annealing) during cold-rolling. With an intermediate heat treatment during the cold-rolling, wherein the heat treatment is carried out in a favorably selected temperature and time range, this does not necessarily mean that the corrosion resistance of the finished brazing sheet is negatively affected. In order to obtain an adequate degree of work hardening in the brazing sheet, the thickness of the brazing sheet is reduced by preferably at least 50% following the intermediate heat treatment in one or more cold-rolling stages.

Prior to carrying out a brazing cycle it is usual for the combination to be converted into a desired shape. Cold-rolled sheet does not have optimum formability so that it is often necessary to anneal the sheet or combination in order to obtain the desired formability. For full annealing this is usually carried out in a temperature range of 350–425° C., and for partial annealing this is usually carried out in a temperature range of 250–350° C.

When the brazing sheet product with the aluminium alloy in accordance with the invention as core alloy, is provided with one or more filler layers, these may comprise an aluminium alloy with an Si content in a range of 5–15 wt. %. Alternatively the clad layer is an aluminium alloy with Zn as main alloying element. The advantage of such a brazing sheet product is that it may be processed with existing processing techniques such as vacuum brazing and controlled atmosphere brazing such as flux brazing.

The aluminium alloy in accordance with the invention or a brazing sheet product with the aluminium alloy in accordance with the invention as core layer is perfectly suitable for being processed to any desired sheet thickness and to any desired temper. Furthermore, it is possible by means of extrusion techniques to process the aluminium alloy into (semi) finished products with a good corrosion resistance.

EXAMPLES

Figure 1:
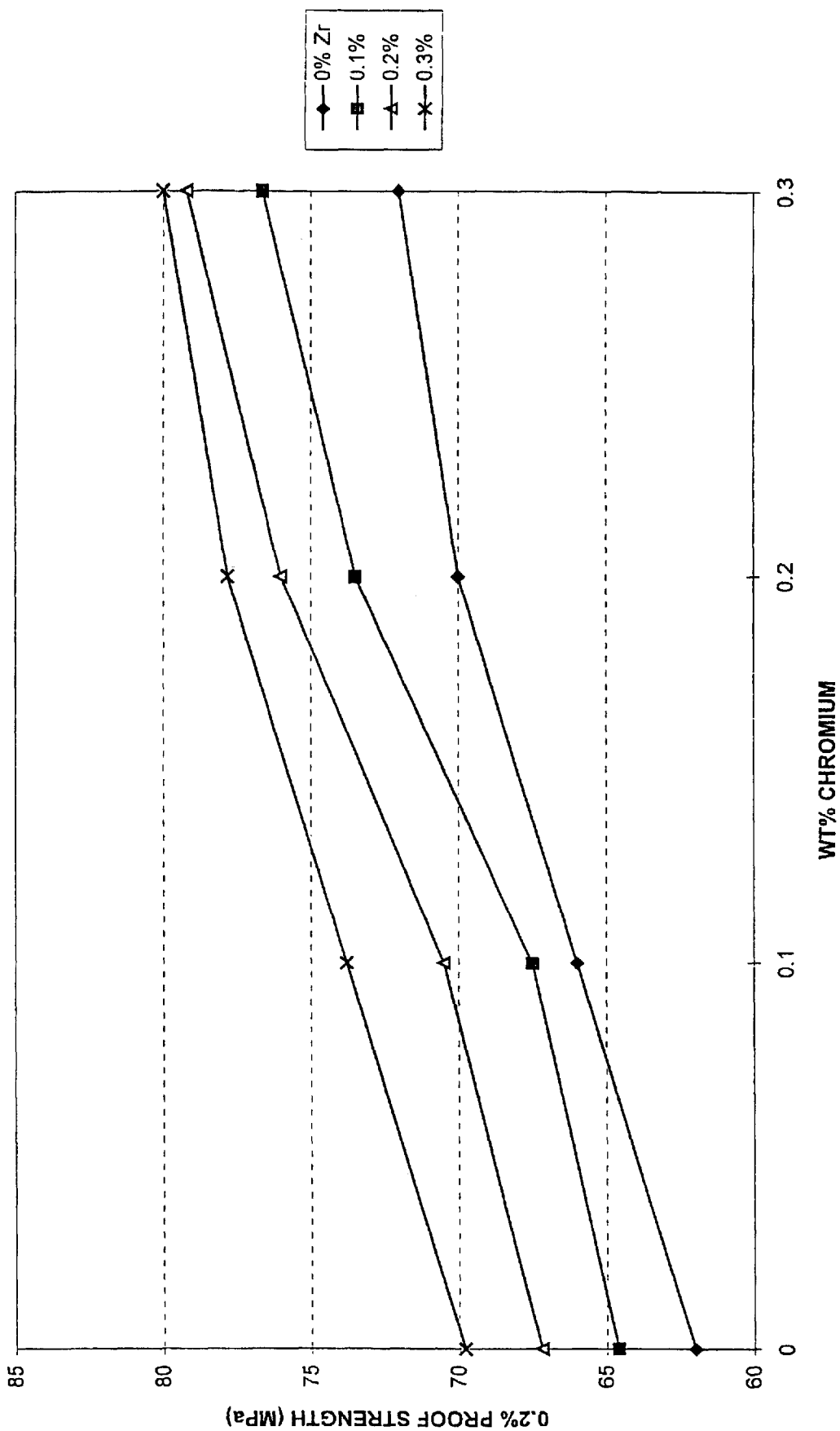
FIG. 1 of the accompanying drawing is a graph showing the effect of the Cr and Zr contents on 0.2% yield (proof) strength.

The aluminium alloy and brazing sheet in accordance with the invention will now be illustrated by non-limitative examples.

Example 1

The following test was carried out on a laboratory scale. Ingots of twelve aluminium alloys for use as core alloys in brazing sheets were cast and solidified at a cooling rate comparable to those cooling rates that occur in DC-casting. Table 1 gives the compositions of the alloys, in % by weight (balance Al and impurities). The ingots were heated to 450° C., hot-rolled to a thickness of 5 mm, and then cold-rolled to a finished thickness of 0.35 mm. The cold-rolled sheets were annealed for 3 hours at a temperature of 350° C. Mechanical properties were assessed and these are given in Table 2. The aluminium alloys were tested in the "post-brazing state", i.e. after the simulated brazing cycle given above.

Alloys 1 and 6 are reference alloys which come within the compositional range of the aluminium alloys of WO 94/22633 discussed above. Aluminium alloys 2–5 and 7–9 are alloys in accordance with the invention. The others are for comparison purposes.

From the results given in Table 2 it can be seen that the aluminium alloy in accordance with the invention has a higher yield strength and tensile strength than the known aluminium alloy of WO 94/22633.

Comparison of alloys 7 and 8 shows that a higher Cu content results in a higher strength. Comparison of alloys 4 and 5 shows that an increase of only the Ti content results in a small increase in the strength.

The results further show that in a high Zr content in combination with a high Ti content results surprisingly in an alloy with a high strength, a concept not found in WO 94/22633.

TABLE 1

| Alloy | Fe | Si | Mn | Cu | Mg | Ti | Cr | Zr | (Cr + Zr) | (Ti + Zr) |
|---|---|---|---|---|---|---|---|---|---|---|
| 1 | 0.18 | 0.07 | 0.75 | 0.93 | 0.36 | 0.09 | 0.02 | — | 0.02 | 0.09 |
| 2 | 0.18 | 0.08 | 0.74 | 0.93 | 0.36 | 0.09 | 0.15 | 0.11 | 0.26 | 0.20 |
| 3 | 0.17 | 0.06 | 1.06 | 0.93 | 0.36 | 0.09 | 0.15 | 0.12 | 0.27 | 0.21 |
| 4 | 0.19 | 0.06 | 1.08 | 0.92 | 0.34 | 0.15 | 0.16 | 0.11 | 0.27 | 0.26 |
| 5 | 0.17 | 0.07 | 1.15 | 0.94 | 0.36 | 0.07 | 0.15 | 0.11 | 0.26 | 0.18 |
| 6 | 0.18 | 0.07 | 0.76 | 0.60 | 0.23 | 0.09 | 0.02 | — | 0.02 | 0.09 |
| 7 | 0.18 | 0.07 | 1.09 | 0.98 | 0.49 | 0.02 | 0.15 | 0.11 | 0.26 | 0.13 |
| 8 | 0.17 | 0.06 | 1.09 | 0.60 | 0.48 | 0.02 | 0.16 | 0.10 | 0.26 | 0.12 |
| 9 | 0.17 | 0.06 | 1.05 | 0.92 | 0.46 | 0.14 | 0.15 | 0.10 | 0.25 | 0.24 |
| 10 | 0.19 | 0.08 | 1.22 | 0.94 | 0.48 | 0.02 | 0.15 | 0.11 | 0.26 | 0.13 |
| 11 | 0.17 | 0.07 | 1.09 | 0.35 | 0.51 | 0.01 | 0.02 | — | 0.02 | 0.01 |
| 12 | 0.19 | 0.08 | 1.10 | 0.75 | 0.50 | 0.02 | 0.15 | 0.08 | 0.23 | 0.10 |

TABLE 2

| Alloy | 0.2% yield strength [MPa] | tensile strength [MPa] | elongation at fracture [%] |
|---|---|---|---|
| 1 | 63 | 176 | 18.7 |
| 2 | 67 | 176 | 18.9 |
| 3 | 69 | 184 | 17.2 |
| 4 | 72 | 166 | 15.1 |
| 5 | 74 | 190 | 19.5 |
| 6 | 54 | 157 | 21.3 |
| 7 | 75 | 194 | 17.3 |
| 8 | 69 | 177 | 15.8 |
| 9 | 78 | 196 | 16.6 |
| 10 | 77 | 199 | 17.2 |
| 11 | 60 | 165 | 18.8 |
| 12 | 67 | 178 | 12.4 |

Alloys 1, 3, 4 and 5 of Table 1, and three alloys (nos. 13–15) not including Ti, Cr and Zr were subjected to the SWAAT test without perforation according to ASTM G-85. The compositions of these alloys including those of alloys 1, 3, 4 and 5 for convenience, and the SWAAT test results are given in Table 3 (% by weight, balance Al and impurities). The SWAAT results for alloys 13, 14 and 15 show the detrimental effect on corrosion resistance of increasing Si above 0.1% to 0.32%.

TABLE 3

| Alloy | Fe | Si | Mn | Cu | Mg | Ti | Cr | Zr | SWAAT (Days) |
|---|---|---|---|---|---|---|---|---|---|
| 1 | 0.18 | 0.07 | 0.75 | 0.93 | 0.36 | 0.09 | 0.02 | — | 11 |
| 3 | 0.17 | 0.06 | 1.06 | 0.93 | 0.36 | 0.09 | 0.15 | 0.12 | 21 |
| 4 | 0.19 | 0.06 | 1.08 | 0.92 | 0.34 | 0.15 | 0.16 | 0.11 | 16 |
| 5 | 0.17 | 0.07 | 1.15 | 0.94 | 0.36 | 0.07 | 0.15 | 0.11 | 20 |
| 13 | 0.10 | 0.09 | 1.06 | 0.67 | 0.34 | — | — | — | >20 |
| 14 | 0.10 | 0.20 | 1.06 | 0.93 | 0.57 | — | — | — | 7 |
| 15 | 0.10 | 0.32 | 1.07 | 0.66 | 0.33 | — | — | — | 7 |

Example 2

Alloys having the base composition, in wt. %:

| | |
|---|---|
| Mn | 1.1 |
| Cu | 0.9 |
| Mg | 0.5 |
| Si | 0.09 |
| Fe | 0.17 |
| Ti | 0.08 |
| balance Al and impurities. | | and containing varying amounts of Cr and Zr were made, and the 0.20% yield (proof) strength in post-brazing condition (simulated brazing cycle) was measured. The results are plotted in FIG. 1. Cr and Zr both enhance strength, and it can be seen that in the region of 0.20% Cr, the effect of addition of 0.1–0.2% Zr is more significant.

What is claimed is:

1. A brazing sheet comprising an aluminium alloy for use as a core material in the brazing sheet, the core material having a high corrosion resistance in the absence of a sacrificial anode coating layer, comprising, in weight %:

| | |
|---|---|
| Mn | 0.7–1.5 |
| Cu | 0.6–1.0 |
| Fe | not more than 0.4 |
| Si | at most 0.08 |
| Mg | 0.05–0.8 |
| Ti | 0.02–0.09 |
| Cr | 0.1–0.25 |
| Zr | 0.1–0.2 | wherein 0.20<(Cr+Zr)≦0.4,
wherein the core has no coating layer for acting as a sacrificial anode in contact with water, the alloy being capable of obtaining in the post-brazing state 0.2% yield strength of at least 65 MPa and having a corrosion life of more than 11 days in a SWAAT test without perforations in accordance with ASTM G-85.

2. A brazing sheet according to claim 1, wherein the corrosion life in said SWAAT test is at least 16 days.

3. A brazing sheet according to claim 1, wherein the Cu content is 0.7–1.0 wt. %.

4. A brazing sheet according to claim 1, wherein the Ti content is 0.08–0.09 wt. %.

5. A brazing sheet according to claim 1, wherein the Mn content is 0.8–1.2 wt. %.

6. A brazing sheet according to claim 1, wherein said core material has a clad layer on at least one side thereof.

7. A method of making a brazing sheet according to claim 1, comprising providing said alloy as core material of the brazing sheet in a brazed assembly, applying a clad layer to the core material.

8. A method of use according to claim 7, wherein the core material contacts at least one said clad layer of a low melting point brazing alloy.

9. A brazed assembly comprising at least two members bonded together by means of a brazing alloy, at least one of said members being of sheet material comprising a brazing sheet according to claim 1.

10. A brazing sheet comprising an aluminium alloy for use as a core material in the brazing sheet, the core material having a high corrosion resistance in the absence of a sacrificial anode coating layer, consisting of, in weight %:

| | |
|---|---|
| Mn | 0.7–1.5 |
| Cu | 0.6–1.0 |
| Fe | not more than 0.4 |
| Si | at most 0.08 |
| Mg | 0.05–0.8 |
| Ti | 0.02–0.09 |
| Cr | 0.1–0.25 |
| Zr | 0.1–0.2 | balance Al and unavoidable impurities wherein 0.20<(Cr+Zr)≦0.4,
wherein the core has no coating layer acting as a sacrificial anode in contact with water, the alloy being capable of obtaining in the post-brazing state 0.2% yield strength of at least 65 MPa and having a corrosion life of more than 11 days in a SWAAT test without perforations in accordance with ASTM G-85.

* * * * *